Sept. 13, 1960 D. P. KENNEDY 2,952,817
SEMICONDUCTOR NOISE GENERATORS
Filed Nov. 17, 1954
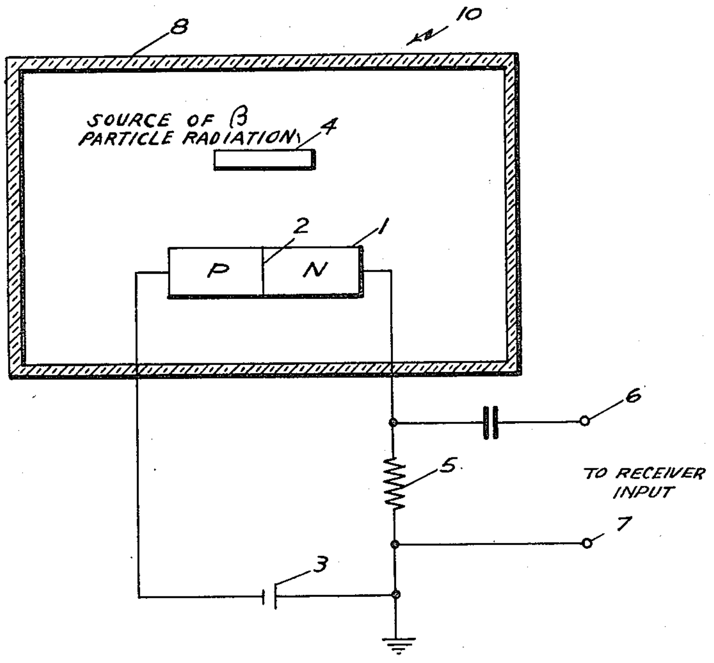
INVENTOR
DAVID P. KENNEDY
BY Elmer J. Gorn
ATTORNEY 2,952,817
Patented Sept. 13, 1960

2,952,817

SEMICONDUCTOR NOISE GENERATORS

David P. Kennedy, Waltham, Mass., assignor to Raytheon Company, a corporation of Delaware Filed Nov. 17, 1954, Ser. No. 469,367

4 Claims. (Cl. 331—68)

This invention relates generally to random noise generators, and more particularly to an improved form of such generator wherein a body of semiconductive material having areas of different conductivity types may be utilized to generate a noise signal having a flat power spectrum in the audio frequency band.

In many instances, it is often desirable to provide a standard source of noise signal for use in various electrical applications as, for example, in room acoustics measurements, loudspeaker and microphone tests, and the like. However, considerable difficulty has been encountered in providing a noise generator which will perform satisfactorily at the lower frequencies. At the present time, the noise standard normally used is a temperature-limited diode. This is a convenient noise generator at the broadcast and medium high frequencies having a flat power spectrum over this range. However, at audio and sub-audible frequencies its use as a standard is unsatisfactory due to flicker effect in its output.

In accordance with the present invention, it has been found that a body of semiconductive material having areas of different conductivity types forming a P-N junction will, when placed in the vicinity of a source of radiation, generate a noise signal which appears as a fluctuation in the saturation current of a properly biased body, and has a flat power spectrum in the audio frequency region.

The invention will be better understood as the following description proceeds, taken in conjunction with the accompanying drawing wherein the single figure is a diagrammatic representation of a noise generator according to the present invention.

Referring now to the figure, there is shown generally at 10 a noise generator including a body of semiconductive material 1, which may be germanium, for example. By methods well known in the art, semiconductor 1 is provided with areas wherein the semiconductive material in one area is of a different conductivity type from the material in an adjacent area, the boundary between the sections forming a so-called P-N junction designated at 2. Semiconductor 1 is biased in the reverse direction, i.e., the negative side of a battery 3 is connected to the P type region of the body while the positive side of battery 3 is connected to the N type region.

In order to generate a noise signal in accordance with the invention, a source of radiation 4 capable of liberating hole-electron pairs in the semiconductor 1, for example, a source of $\beta$ particle radiation such as a body of radio-active material, is positioned near the junction 2. When the junction 2 is thus submitted to the relatively low energy radiation from source 4, the additional flow of current due to the liberation of the hole-electron pairs appears as fluctuations in the saturation current flowing through grounded resistor 5, and constitutes a noise current, the effects of which appear at output terminals 6 and 7. It was found that this noise current was in proportion to the flux density of the $\beta$ particle radiation, thus providing a means for constructing an improved noise generator by simply mounting a radiation source near the semiconducting material. Measurements have determined that the generated noise yielded a flat power spectrum over a frequency range of approximately 100 c.p.s. to 16 kc.

To complete the unit, semiconductor 1, and radiation source 4, may be enclosed in a protective housing 8. Housing 8 may be made of metal or glass, for example, and in the event that glass is used it is preferably opaque in order to eliminate the liberation of additional hole-electron pairs due to light shining on the body 1.

Although there has been described what is considered to be a preferred embodiment of the present invention, various adaptations and modifications thereof will occur to those skilled in the art. For instance, the noise generator of the present invention indicates usefulness at the higher frequencies as well as in the audio range. It is therefore desired that the appended claims be given a broad interpretation commensurate with the scope of the invention within the art.

What is claimed is:

1. A random noise generator comprising a semiconductive body having areas therein of P type conductivity material and N type conductivity material forming a P-N junction, biasing means connected to said body in the reverse direction, a source of relatively low energy radiation having an energy value ranging from substantially that of $\beta$ particle radiation to lower values and capable of liberating hole-electron pairs in said body, said source being positioned near said body whereby audio frequency noise signals are generated in said body, and means for passing said audio frequency noise signals to an output circuit connected to said body.

2. A random noise generator comprising a body of semiconductive material having areas therein of P type conductivity material and N type conductivity material forming a P-N junction, biasing means connected to said body in the reverse direction, a source of $\beta$ particle radiation positioned near said body whereby audio frequency noise signals are generated in said body, and means for passing said audio frequency noise signals to an output circuit connected to said body.

3. A standard random noise generator comprising a body of semiconductive material having areas therein of P type conductivity material and N type conductivity material forming a P-N junction, biasing means connected to said body in the reverse direction, a source of relatively low energy radiation having an energy value ranging from substantially that of $\beta$ particle radiation to lower values and capable of liberating hole-electron pairs in said body, said source being positioned near said body whereby audio frequency noise signals are generated in said body, a protective housing enclosing said body and said radiation source, and means for passing said audio frequency noise signals to an output circuit connected to said body.

4. A standard random noise generator comprising a body of semiconductive material having areas therein of P type conductivity material and N type conductivity material forming a P-N junction, biasing means connected to said body in the reverse direction, a source of $\beta$ particle radiation positioned near said body whereby audio frequency noise signals are generated in said body, a protective housing enclosing said body and said radiation source, and means for passing said audio frequency noise signals to an output circuit connected to said body.

References Cited in the file of this patent

UNITED STATES PATENTS

| | | |
|---|---|---|
| 2,402,662 | Ohl | June 25, 1946 |
| 2,537,388 | Wooldridge | Jan. 9, 1951 |

| | | |
|---|---|---|
| 2,543,039 | McKay | Feb. 27, 1951 |
| 2,670,441 | McKay | Feb. 23, 1954 |
| 2,692,950 | Wallace | Oct. 26, 1954 |

OTHER REFERENCES

Article: "Noise Generator," from July 1954 Electronics, page 85.

Article: "Background Noise in Transistors," by Montgomery, from Bell Labs. Record; vol. 28, No. 9, September 1950, pages 400–403.

"Transistor Circuits," by Shea et al., John Wiley and Sons, copyrighted September 18, 1953; pp. 1–12.